US012680812B1

(12) United States Patent
Rentz et al.

(10) Patent No.: US 12,680,812 B1
(45) Date of Patent: Jul. 14, 2026

(54) WIRELESS TILT SENSOR SYSTEM FOR A WASTE OR RECYCLING SERVICES VEHICLE

(71) Applicant: WM Intellectual Property Holdings, L.L.C., Houston, TX (US)

(72) Inventors: Matthew Rentz, Sacramento, CA (US); Michael Nagy, Sacramento, CA (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/910,932

(22) Filed: Oct. 9, 2024

Related U.S. Application Data

(60) Provisional application No. 63/543,254, filed on Oct. 9, 2023.

(51) Int. Cl.
*G01C 9/06* (2006.01)
*B65F 3/04* (2006.01)

(52) U.S. Cl.
CPC ................ *G01C 9/06* (2013.01); *B65F 3/041* (2013.01)

(58) Field of Classification Search
CPC .................................. G01C 9/06; B65F 3/041
See application file for complete search history.

(56) References Cited

U.S. PATENT DOCUMENTS

| | | | | |
|---|---|---|---|---|
| 3,883,021 A | * | 5/1975 | Wilhelm | B66F 9/0755 |
| | | | | 116/304 |
| 4,598,797 A | * | 7/1986 | Schultz | B66F 17/003 |
| | | | | 180/271 |
| 5,131,801 A | * | 7/1992 | Melanson | B66F 9/082 |
| | | | | 33/366.26 |
| 5,762,461 A | * | 6/1998 | Frohlingsdorf | B65F 3/00 |
| | | | | 414/408 |
| 5,837,945 A | | 11/1998 | Cornwell et al. | |
| 5,851,100 A | * | 12/1998 | Brandt | B65F 3/04 |
| | | | | 414/730 |
| RE37,215 E | * | 6/2001 | Dammeyer | B66F 9/16 |
| | | | | 701/50 |

(Continued)

FOREIGN PATENT DOCUMENTS

| | | |
|---|---|---|
| CA | 3183302 A | 5/2023 |
| EP | 4116227 A1 | 1/2023 |
| JP | 7026021 B1 | 2/2020 |

OTHER PUBLICATIONS

Pepperl-Fuchs; Sensing Solutions for Mobile Equipment; 2023; 40 pages.

(Continued)

*Primary Examiner* — Kristina M Deherrera
*Assistant Examiner* — Tania Courson
(74) *Attorney, Agent, or Firm* — Greenberg Traurig LLP

(57) ABSTRACT

A wireless tilt sensor system for a waste or recycling services vehicle is provided. The sensor component can be operationally connected to a low power inclinometer or accelerometer to detect movement and tilt angle for a lift arm of the waste or recycling services vehicle and filter out spurious forces from truck movement vibration. The wireless tilt sensor system has a number of advantages over prior technologies, including, without limitation, lowering the cost of the inclination switch, removing all wires routed through the truck, uses long lasting batteries, and can communicate with multiple types of devices (e.g., PS, tilt trigger, etc.).

5 Claims, 5 Drawing Sheets

(56)  References Cited

U.S. PATENT DOCUMENTS

| | | | | |
|---|---|---|---|---|
| 6,526,668 | B1 * | 3/2003 | Beckhart | G01C 9/06 |
| | | | | 33/366.11 |
| 7,909,561 | B2 * | 3/2011 | Addleman | B66F 9/061 |
| | | | | 414/563 |
| 8,330,059 | B2 | 12/2012 | Curotto | |
| 8,833,823 | B2 * | 9/2014 | Price | B66C 1/44 |
| | | | | 294/198 |
| 9,829,892 | B1 | 11/2017 | Rodoni | |
| 9,981,803 | B2 * | 5/2018 | Davis | B65F 3/28 |
| 10,713,599 | B2 | 7/2020 | Podgorny | |
| 11,042,750 | B2 | 6/2021 | Wildgrube et al. | |
| 11,099,560 | B2 * | 8/2021 | Smith | G05D 1/81 |
| 11,319,147 | B2 | 5/2022 | Maroney et al. | |
| 11,453,550 | B2 * | 9/2022 | Maroney | B25J 13/088 |
| 11,766,941 | B2 * | 9/2023 | Davis | B65F 3/02 |
| | | | | 180/65.1 |
| 12,240,692 | B2 * | 3/2025 | Maroney | B65F 3/02 |
| 2004/0098872 | A1 * | 5/2004 | Pfeil | B66F 9/082 |
| | | | | 33/333 |
| 2012/0066920 | A1 * | 3/2012 | Stangl | G01C 9/06 |
| | | | | 33/366.11 |
| 2016/0273196 | A1 * | 9/2016 | Funk | E02F 3/432 |
| 2019/0056416 | A1 | 2/2019 | Rodoni | |
| 2019/0299732 | A1 * | 10/2019 | Smith | B62D 15/0285 |
| 2020/0191580 | A1 | 6/2020 | Christensen et al. | |
| 2021/0188541 | A1 | 6/2021 | Kurani et al. | |
| 2021/0201692 | A1 | 7/2021 | Hashimoto et al. | |
| 2022/0021803 | A1 | 1/2022 | Miller et al. | |
| 2022/0118854 | A1 | 4/2022 | Davis et al. | |

OTHER PUBLICATIONS

Sundaram, N. Meenatchi et al.; Robotic Vehicle Movement and Arm Control Through Hand Gestures Using Arduino; International Research Journal of Engineering and Technology; Apr. 2018; 6 pages.

* cited by examiner

WIRELESS TILT SENSOR SYSTEM FOR A WASTE OR RECYCLING SERVICES VEHICLE

RELATED APPLICATION

This application claims the benefit, and priority benefit, of U.S. Provisional Patent Application Ser. No. 63/543,254, filed Oct. 9, 2023, the disclosure and content of which is incorporated by reference herein in its entirety.

BACKGROUND

1. Field of Invention

The presently disclosed subject matter relates generally to monitoring of waste or recycling services vehicles, and more particularly, to a wireless tilt sensor system for a waste or recycling services vehicle.

2. Description of the Related Art

An inclination switch is an electrical component that measures the tilt of an object in multiple axes with reference to an absolute level plane. This electrical component can be used on a waste or recycling services vehicle to gauge the tilt of a lift arm when lifting or dumping loads to indicate that the container has been emptied and to confirm that the customer has been serviced.

Current iterations of an inclination switch that are installed on a waste services vehicle use cabling that is long and often breaks, which results in system unreliability. These current iterations also produce only analog notifications of tilt events. Additionally, in some applications the connection points are weak and are subject to disconnection without much force applied. Moreover, the cabling is subject to degradation in harsh environments as well as consumption by rodents.

Improvements in this field of technology are therefore desired.

SUMMARY

Various illustrative embodiments of a tilt sensor system for a waste or recycling services vehicle are provided herein.

In certain illustrative embodiments, the system can include: a tilt sensor component positioned on the lift arm of the waste or recycling services vehicle and comprising a tilt sensor device, a first power source, and a first communications component; and a receiver component comprising a relay device, a second power source, and a second communications component that is configured to communicate directly with the first communications component, wherein the tilt sensor device is configured to: recognize when the lift arm is in a level position, identify when the lift arm has moved from the level position to a tilt position and has remained in the tilt position for at least a pre-designated period of time, and send an instruction to the first communications component to communicate wirelessly to the second communications component that the lift arm has moved to the tilt position.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a wireless tilt sensor system 10 for a waste or recycling services vehicle 5 are provided herein.

Figure 1:
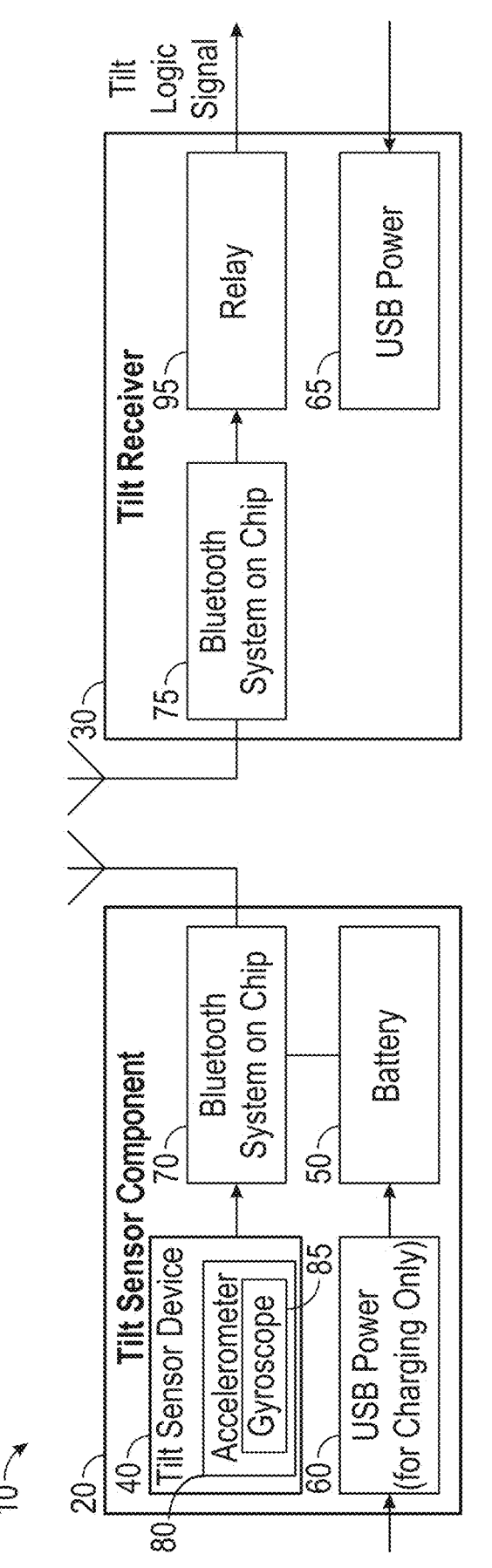
FIG. 1 is an image of a wireless tilt sensor system for a waste or recycling services vehicle, in accordance with an illustrative embodiment of the presently disclosed subject matter.

FIG. 1 shows an overview of the components of the presently disclosed system 10, in certain illustrative embodiments.

In certain illustrative embodiments, the presently disclosed system 10 can include an tilt sensor component 20 and at least one accompanying receiver component 30. The tilt sensor component 20 can include, without limitation, a tilt sensor device 40, a battery 50, a USB power source 60, and a wireless communications component 70 such as Bluetooth® or other wireless technology. The receiver component 30 can include, without limitation, a relay device 95, a USB power source 65, and a wireless communications component 75 such as Bluetooth® or other wireless technology that is compatable with, and configured to communicate directly with, wireless communications component 70 from sensor component 20. As shown in FIGS. 2-5, tilt sensor component 20 and receiver component 30 can comprise a housing that encloses and houses the various functional equipment of each component 20 and 30 as described above and shown in FIG. 1.

In certain illustrative embodiments, the sensor component 20 can be configured to use the communications component 70 with a unique code to recreate the trigger mechanism of the pre-existing inclination switch on the waste or recycling services vehicle 5. The receiver component 30 can be configured to receive a message from the communications component 70 of the sensor component 20 and activate a further process.

In certain illustrative embodiments, there can be one or more physical buttons on the sensor component 20 and one or more physical buttons on the receiver component 30 to allow for pairing and connection reset between the sensor component 20 and the receiver component 30.

In certain illustrative embodiments, the system 10 can be wired directly to power via the USB power source 60 and/or may be battery powered via battery 50.

In certain illustrative environments, the sensor component 20 can be operationally connected to a low power inclinometer or accelerometer 80 to detect movement and tilt angle for a lift arm 90 of the waste or recycling services vehicle 5 and filter out spurious forces from truck movement vibration. The inclinometer or accelerometer 80 may also include a gyroscope 85 to measure movement of the lift arm 90.

In certain illustrative embodiments, the sensor component 20 can pair with receiver component 30 (or multiple receiver components 30) and securely transmit tilt events when they occur. The receiver component 30 can send a logic signal to a subsequent monitoring system when tilt events are received.

In certain illustrative embodiments, the sensor component 20 can reliably detect arm movements of lift arm 90 that tilt past a pre-determined threshold, and the sensor component 20 can then transmit events wirelessly to the receiver component 30 that triggers a logic signal when the events occur. As used herein, the term tilt refers to either tilt or inclination, whereby tilt refers to a deviation from the upright or level position, while inclination refers to a gradual or subtle change in elevation or direction, either of which occur past the pre-determined threshold (e.g., an angle of displacement).

The receiver component 30 can obtain the tilt event information from the sensor component 20 and convert the information to an analog signal that will indicate that the lift arm 90 of the waste or recycling services vehicle 5 has been moved, e.g., for a dump of waste materials, to the user's internal vehicle monitoring system.

In certain illustrative embodiments, the system 10 can include a wireless inclination sensor component 20 and one or more compatible receiver components 30. The sensor component 20 and the receiver component 30 can also be wired or battery powered and rechargeable. The relay device 95 of receiver component 30 can trigger a 12 v signal.

In certain illustrative embodiments, the Bluetooth® functionality of the sensor component 20 and the receiver component 30 can trigger other systems to perform additional tasks, such as activating other on-board functions or turning on an RFID reader on the waste or recycling services vehicle 5.

In certain illustrative embodiments, system 10 can be used to filter out false tips (e.g., shaking of cart on the waste or recycling services vehicle 5). For example, the waste or recycling services vehicle 5 can have a trigger 55 located on the tilt sensor 40 that connects to the inclinometer or accelerometer 80 via Bluetooth® low energy (BLE) and triggers a relay whenever the inclinometer or accelerometer 80 detects a tilt. When detected, the system 10 is configured with a custom GATT (Generic Attribute Profile) characteristic that sends a flag for "tilt" and "return to normal state" of the inclinometer or accelerometer 80 to the receiver component 30.

In certain illustrative embodiments, a time delay (e.g., 2 seconds) can be implemented from when the tilt sensor 40 detects the normal state for the inclinometer or accelerometer 80 before a tilt signal is allowed. Thus, the system 10 includes a tilt sensor component 20 positioned on the lift arm 90 of the waste or recycling services vehicle 5 and a receiver component 20 positioned at another location such as on the body of the waste or recycling services vehicle 5, and the tilt sensor component 20 can have a tilt sensor device 30 that is configured to recognize when the lift arm 90 is in a level position, identify when the lift arm 90 has moved from the level position to a tilt position and has remained in the tilt position for at least a pre-designated period of time (e.g., 2 seconds or more), and then send an instruction to the first communications component 70 to communicate wirelessly to the second communications component 75 that the lift arm 95 has moved to the tilt position. This feature is meant to allow the driver of the waste or recycling services vehicle 5 to have a cushion of time and opportunity to shake the cart on the vehicle 5 before setting it down without setting off the trigger indicating that tilt of the lift arm 90 has occurred.

System 10 has a number of advantages over prior technologies, including, without limitation, lowering the cost of the inclination switch, removing wires routed through the truck, using long lasting batteries, and communication with multiple types of devices (e.g., PS, Tilt trigger, etc.).

Figure 2:
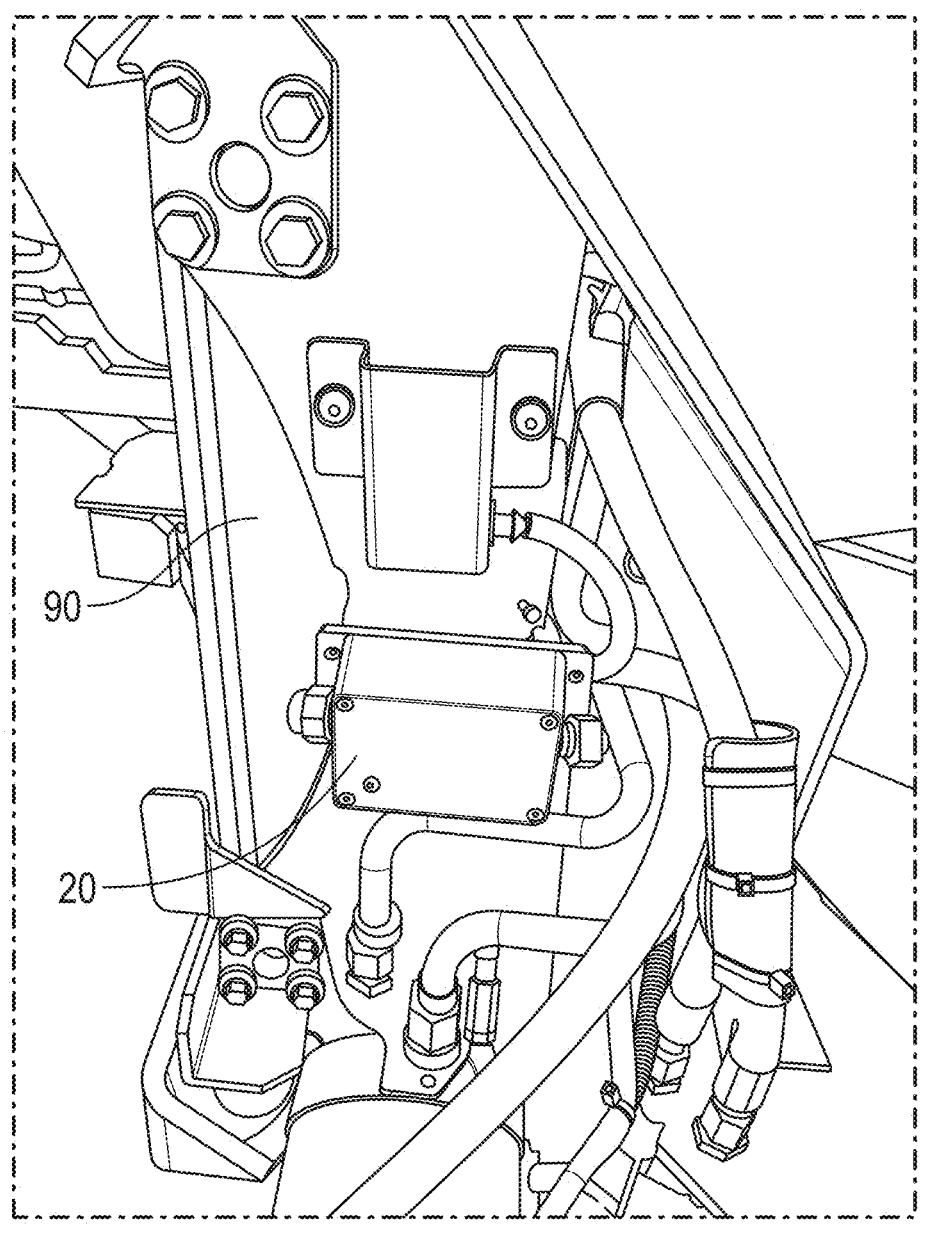
FIG. 2 is an image of a sensor component for a wireless tilt sensor system mounted on a lift arm of a waste or recycling services vehicle, in accordance with an illustrative embodiment of the presently disclosed subject matter.
Figure 3:
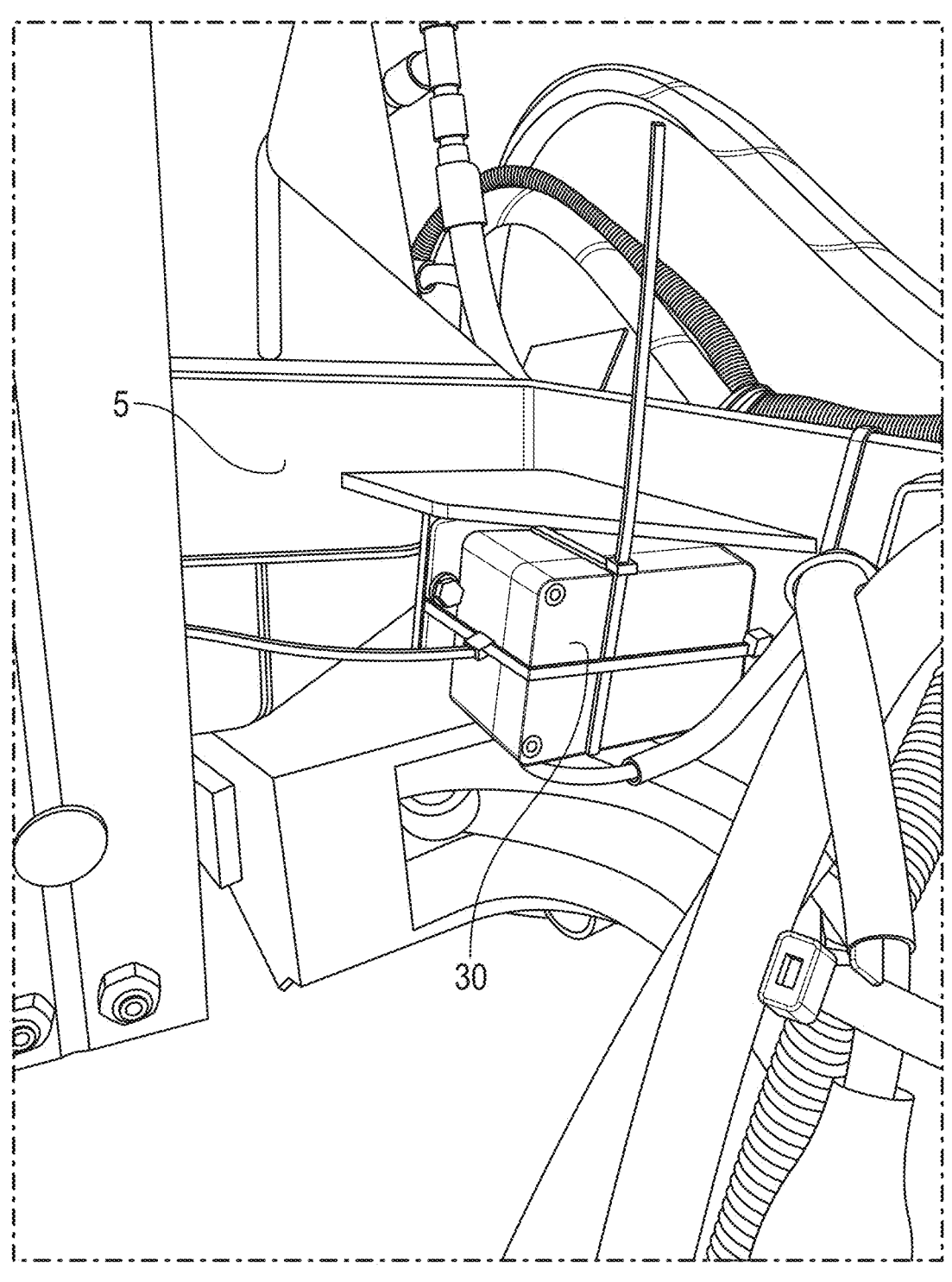
FIG. 3 is an additional image of a sensor component for a wireless tilt sensor system mounted on a lift arm of a waste or recycling services vehicle, in accordance with an illustrative embodiment of the presently disclosed subject matter.
Figure 4:
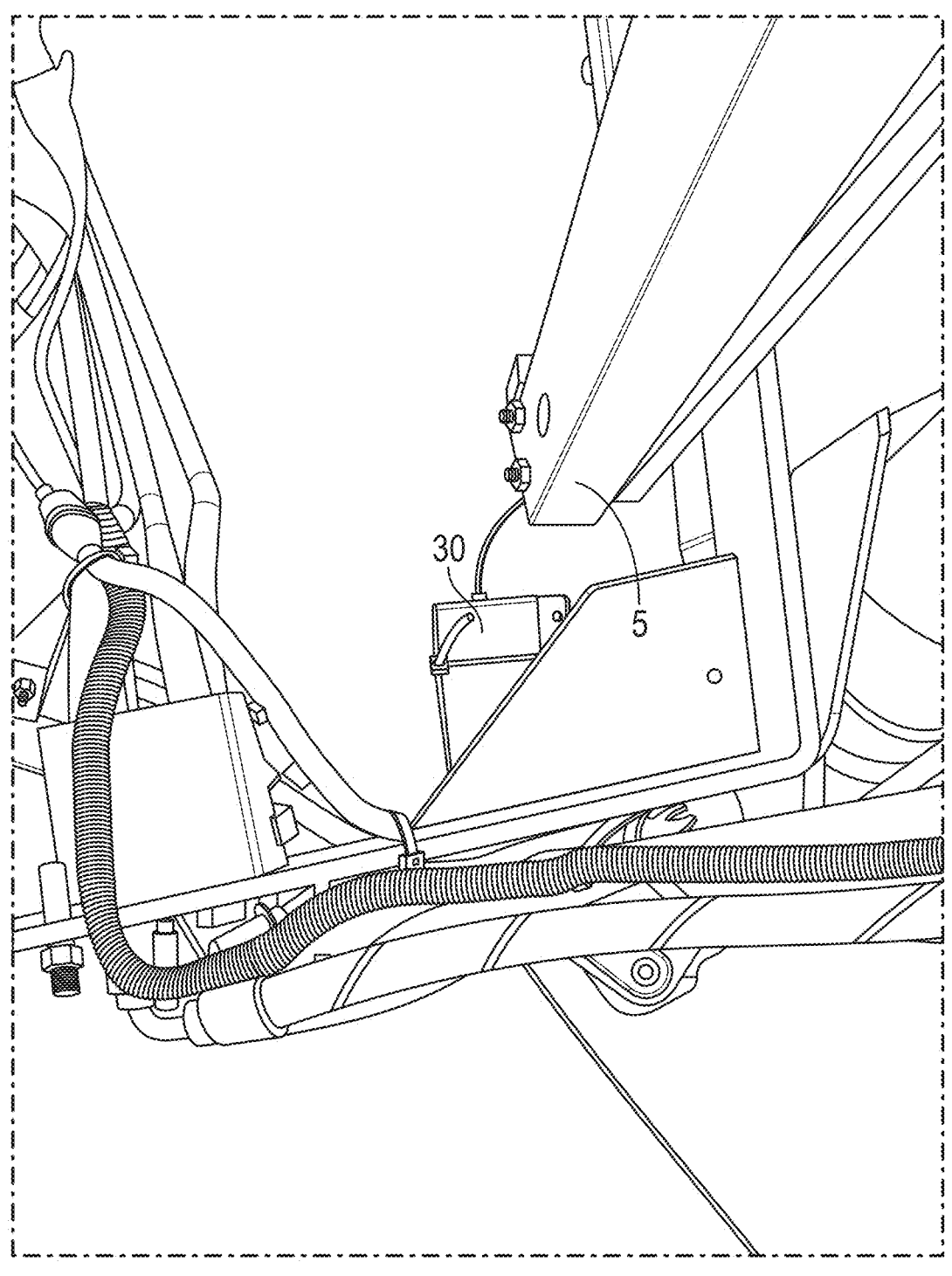
FIG. 4 is an additional image of a sensor component for a wireless tilt sensor system mounted on a lift arm of a waste or recycling services vehicle, in accordance with an illustrative embodiment of the presently disclosed subject matter.
Figure 5:
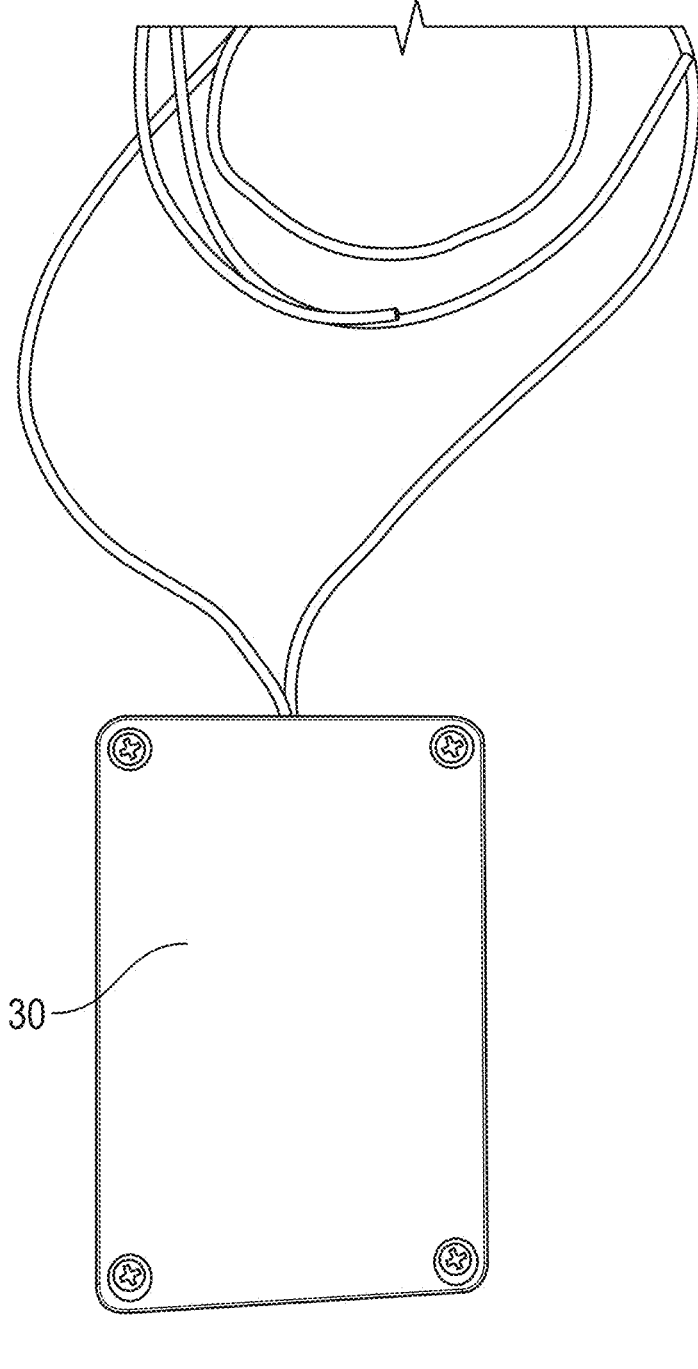
FIG. 5 is an image of a receiver component for a wireless tilt sensor system for a waste or recycling services vehicle, in accordance with an illustrative embodiment of the presently disclosed subject matter.

FIGS. 2-4 are images of the sensor component 20 on the lift arm 90 of the vehicle 5, which includes tilt sensor device 40. The receiver component 30 is shown separately in FIG. 5, and in operation would be placed on the body of the vehicle 5.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A tilt sensor system for a waste or recycling services vehicle, comprising:

a tilt sensor component positioned on a lift arm of the waste or recycling services vehicle, the lift arm configured to lift a waste or recycling container, the tilt sensor component comprising a tilt sensor device, a first power source, and a first communications component, wherein the tilt sensor component is operably connected to an accelerometer configured to detect movement and tilt angle for the lift arm, and wherein the accelerometer comprises a gyroscope configured to measure movement of the lift arm; and a receiver component comprising:

a relay device;

a second power source; and a second communications component that is configured to communicate directly with the first communications component; and wherein:

the tilt sensor device generates a signal corresponding to a respective tilt angle for the lift arm; and in response to receiving the signal corresponding to each respective tilt angle for the lift arm, the tilt sensor component implements a delay in signal transmittal to the second communications component, the delay in signal transmittal comprising suppressing signal transmittal corresponding to the change in tilt angle for a pre-designated period of time; and after the pre-designated period of time has passed, the tilt sensor component sends an instruction to the first communication component to communicate to the second communications component a change in tilt angle for the lift arm.

2. The tilt sensor system of claim 1, wherein the instruction to the first communication component is to communicate wirelessly to the second communication component.

3. The tilt sensor system of claim 1, wherein the signal corresponding to the respective tilt angle for the lift arm indicates a deviation from a level or upright position.

4. The tilt sensor system of claim 1, wherein the signal corresponding to the respective tilt angle for the lift arm indicates a change in elevation or direction.

5. The tilt sensor system of claim 1, wherein the pre-designated period of time is two seconds or more.

* * * * *